United States Patent [19]

Shelton et al.

[11] Patent Number: 5,091,851
[45] Date of Patent: Feb. 25, 1992

[54] FAST MULTIPLE-WORD ACCESSES FROM A MULTI-WAY SET-ASSOCIATIVE CACHE MEMORY

[75] Inventors: John F. Shelton, Aptos; Richard J. Carter, Palo Alto, both of Calif.

[73] Assignee: Hewlett-Packard Company, Palo Alto, Calif.

[21] Appl. No.: 382,158

[22] Filed: Jul. 19, 1989

[51] Int. Cl.$^5$ .................. G06F 13/00; G11C 7/00
[52] U.S. Cl. ................. 395/425; 364/243.4; 364/243.41; 364/264.4; 364/DIG. 1; 365/189.02; 365/230.03
[58] Field of Search ... 364/200 MS File, 900 MS File; 365/49, 189.02, 230.01, 230.03

[56] References Cited

U.S. PATENT DOCUMENTS

| | | | |
|---|---|---|---|
| 3,629,842 | 12/1971 | Taylor | 364/200 |
| 4,366,539 | 12/1982 | Johnson et al. | 364/200 |
| 4,424,561 | 1/1984 | Stanley et al. | 364/200 |
| 4,438,493 | 3/1984 | Cushing et al. | 364/200 |
| 4,736,293 | 4/1988 | Patrick | 364/200 |
| 4,866,603 | 9/1989 | Chiba | 364/200 |
| 4,905,188 | 2/1990 | Chuang et al. | 364/900 |
| 4,933,846 | 6/1990 | Humphrey et al. | 364/200 |
| 4,945,512 | 7/1990 | Dekarske et al. | 365/49 |
| 5,014,195 | 5/1991 | Farrell et al. | 364/200 |

Primary Examiner—Michael R. Fleming
Assistant Examiner—Gopal C. Ray
Attorney, Agent, or Firm—Roland I. Griffin; Alan H. Haggard

[57] ABSTRACT

A multi-way set-associative cache memory stores data in a plurality of random access memories. Data in the multi-way set-associative cache memory is organized in lines of data. The multi-way set-associative cache memory allows access of single words and allows access of multiple-words of a length specific to the multi-way set-associative cache memory. Within the plurality of random access memories, data are placed such that corresponding words of each line of data is placed in different random access memories. Further, each word from each multiple word is placed in different random access memories. For single word access, one word is accessed from one of the plurality of random access memories. For multiple-word access, one word from each of the plurality of random access memories is accessed.

17 Claims, 7 Drawing Sheets

FAST MULTIPLE-WORD ACCESSES FROM A MULTI-WAY SET-ASSOCIATIVE CACHE MEMORY

BACKGROUND

The present invention relates to a computer system which utilizes a multi-way set-associative cache memory, the multi-way set-associative cache memory providing fast multiple-word accesses.

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory, many computer systems include a cache memory between the CPU and main memory.

A cache memory is a small, high-speed buffer memory which is used to hold temporarily those portions of the contents of main memory which it is believed will be used in the near future by the CPU. The main purpose of a cache is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks (also called lines) of one or more words of data. Each block has associated with it an address tag that uniquely identifies which block of main memory it is a copy of. Each time the processor makes a memory reference, an address tag comparison is made to see if a copy of the requested data resides in the cache. If the desired memory block is not in the cache, the block is retrieved from the main memory, stored in the cache and supplied to the processor.

In addition to using a cache to retrieve data from main memory, the CPU may also write data into the cache instead of directly to the main memory. When the processor desires to write data to the memory, the cache makes an address tag comparison to see if the data block into which data is to be written resides in the cache. If the data block exists in the cache, the data is written into the data block in the cache and a data "dirty bit" for the data block is set. The dirty bit indicates that data in the data block has been modified, and thus before the data block is deleted from the cache the modified data must be written back into main memory. If the data block into which data is to be written does not exist in the cache, the data block must be fetched into the cache or the data written directly into the main memory.

In a multi-way set-associative cache a single index is used to simultaneously access a plurality of data random access memories (RAMs). A data RAM may be implemented by one or more physical random access memory integrated circuits. A set is a collection of all lines addressed by a single cache index. The number of data RAMs addressed by a single cache index indicates the way number of a cache. For example, if in a cache a single cache index is used to access data from two data RAMs, the cache is a two-way set-associative cache. Similarly, if in a cache a single cache index is used to access data from four data RAMs, the cache is a four-way set-associative cache.

When a multi-way access is made, a tag comparison is made for each data RAM. If a tag comparison indicates the desired data block is in a particular data RAM the operation is performed on/with data from that particular data RAM.

Typically, a cache allows the access of one word at a time. Many systems, however, implement functions performed on multiple-words, for example in floating point arithmetic functions. In order to access, for example, a two-word value it is necessary to make two cache memory accesses in a typical cache. In order to allow for a single cache memory cycle access of a two-word value, some prior art systems have doubled the output size and hence the number of random access integrated circuits used in the implementation. This, however, significantly increases the hardware cost of the cache memory.

SUMMARY OF THE INVENTION

In accordance with the preferred embodiment of the present invention, a multi-way set-associative cache memory is presented. The multi-way set-associative cache memory stores data in a plurality of random access memories referred to as data RAMs. A data RAM may include a number of random access memory integrated circuits. Data in the multi-way set-associative cache memory is transferred to and from system memory in lines of data. A line of data are words of data that are contiguously addressable in the system main memory. Within the cache memory the data is stored in sets of lines of data. The number of lines per set is determined by the way number of the cache. A set is a collection of all lines addressed by a single cache index.

Data within the multi-way set-associative cache memory may be addressed as either single words or as multiple-words of a length specific to the multi-way set-associative cache memory, for example as double-words or quadruple words. Words within each line of data have word positions from 0 to one less than the number of words per line. In a set, corresponding words of data are those words within each line in the set which have the same word positions within their respective lines.

Within the plurality of random access memories, data are placed such that corresponding words of each line of data is placed in different random access memories. Further, each word from each multiple word is placed in different random access memories. For single word access, one word is accessed from one of the plurality of random access memories. For multiple-word access, one word from each of the plurality of random access memories is accessed.

DESCRIPTION OF THE PREFERRED EMBODIMENT

Figure 1:
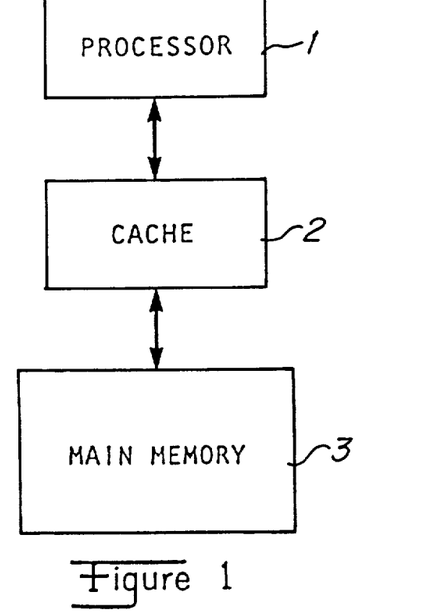
FIG. 1 shows a computing system including a processor, a main memory and a cache memory in accordance with the preferred embodiment of the present invention.

In FIG. 1, a processor 1 utilizes data stored in a main memory 3. In order to increase the rate at which processor 1 accesses data from main memory 3, a cache 2 is utilized. Cache 2 is a cache into which data may be written in a single cache access cycle in accordance with the preferred embodiment of the present invention.

Figure 2:
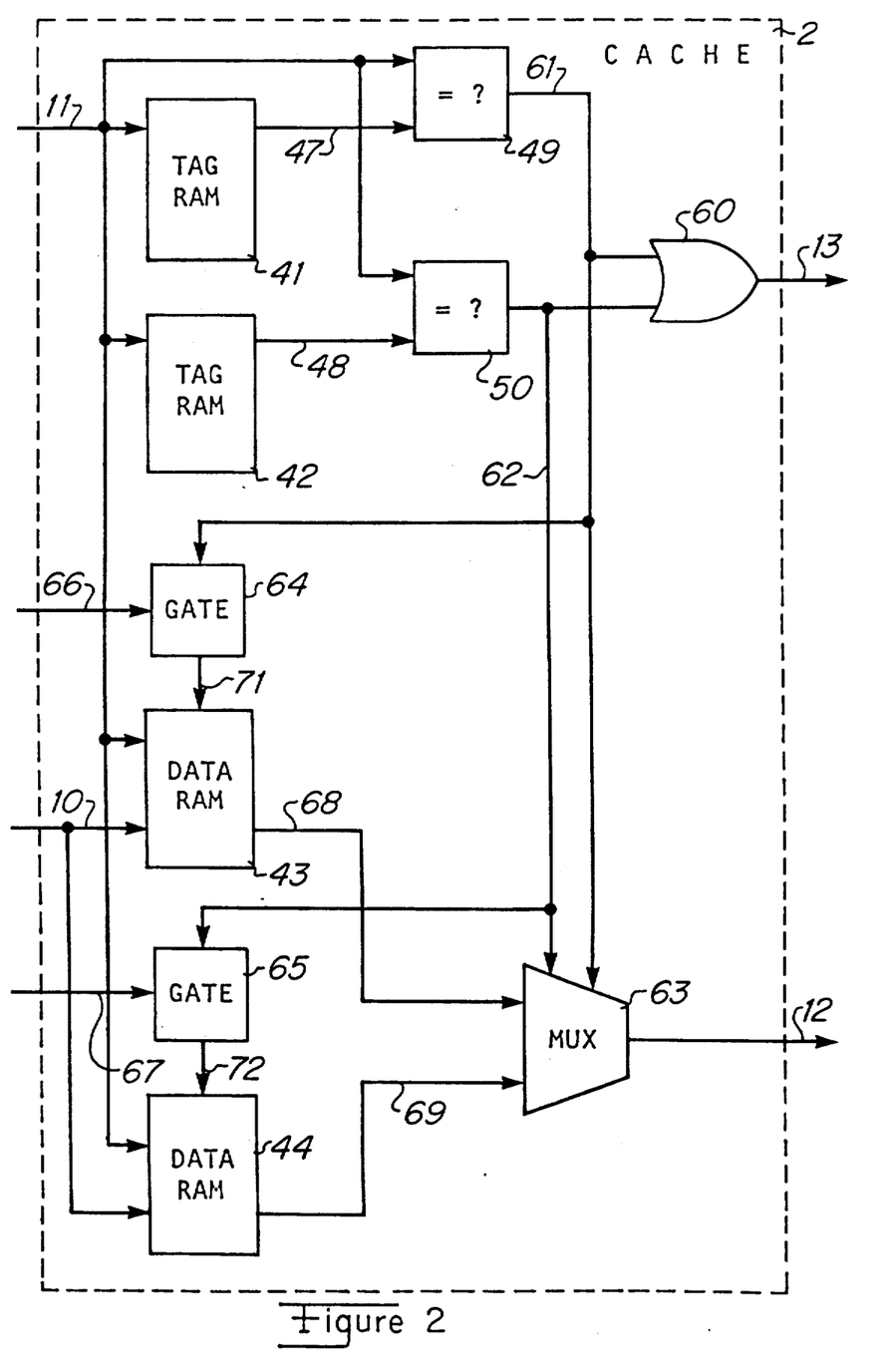
FIG. 2 shows a multi-way set-associative cache memory.

In FIG. 2, cache 2 is shown. Cache 2 is a multi-way set-associative cache which includes a tag RAM 41, a tag RAM 42, a data RAM 43, a data RAM 44, a comparator 49, a comparator 50, a gate 64, a gate 65, a multiplexor 63 and a logical "OR" gate 60.

Figure 3:
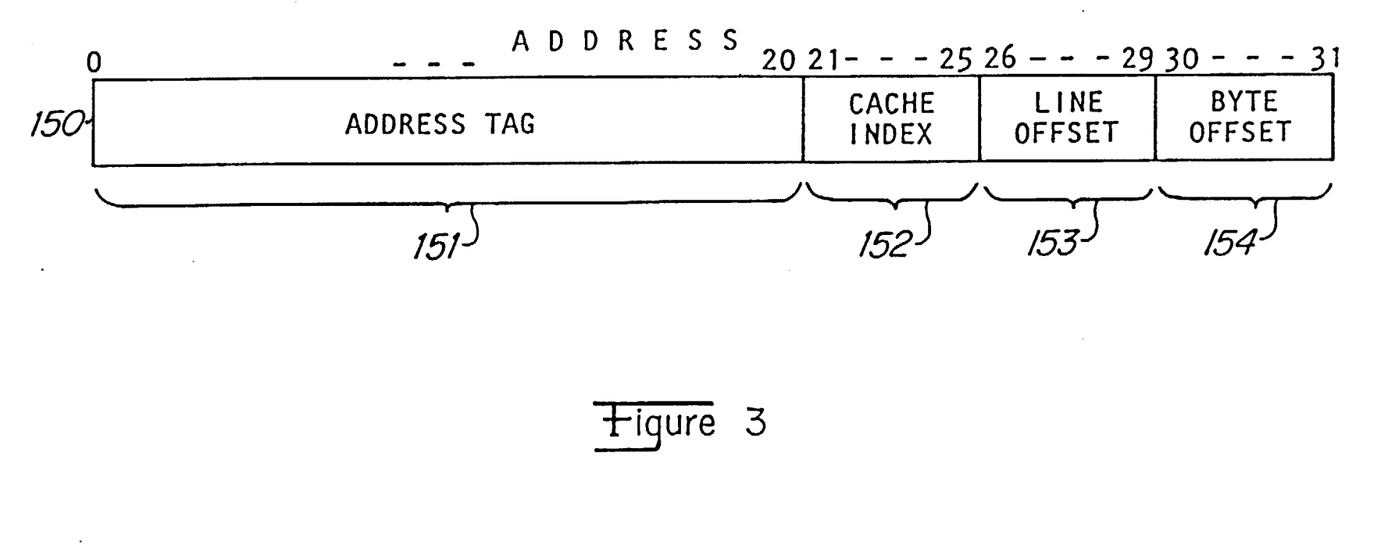
FIG. 3 shows the organization of an address in accordance with a preferred embodiment of the present invention.

When processor 1 desires to read data from cache 2, processor 1 places a read address of data to be read on lines 11. A typical organization for an address is shown in FIG. 3. An address 150 is composed of, for example, 32 bits. Bits 0-20 are used as an address tag 151. Bits 21-25 are used as a cache index 152. Bits 26-29 are used as a line offset 153. Bits 30 and 31 are used as a byte offset 154.

Within data RAM 43 and data RAM 44, data are stored in lines of, for example, 16 words. Data RAM 43 and data RAM 44 each hold a total of, for example, 32 lines of data. Each line of data within data RAM 43 and data RAM 44 is addressed using cache index 152. For each line of data stored in data RAM 43, an address tag is stored in tag RAM 41. For each line of data stored in data RAM 44, an address tag is stored in tag RAM 42. The same cache index is used simultaneously to address address tags in tag RAM 41 and tag RAM 42 and to address the associated data lines in data RAM 43 and data RAM 44.

The cache index portion of the read address is used to access from tag RAM 41 the address tag of the current data line in data RAM 43 at the location specified by the cache index. Tag RAM 41 places the address tag on lines 47. Comparator 49 compares the address tag from tag RAM 41 and the address tag of the read address. If these are equal, comparator 49 produces a valid signal on a line 61. The valid signal is forwarded to multiplexor 63, logical OR gate 60 and gate 64. However, during a cache read cycle, a control signal on an input 66 of gate 64 disables gate 64, thus not allowing the valid signal on line 61 to reach a write enable input line 71 of data RAM 43.

Simultaneous to the access of an address tag from tag RAM 41, the cache index portion and the line offset portion of the read address are used to access a data word within data RAM 43. This data word is placed on a data RAM output 68. When a valid signal is placed on line 61, multiplexor 63 connects data output 68 to lines 12. The data word on lines 12 is returned to processor 1. When the address tag from tag RAM 41 and the address tag of the read address are not equal, an invalid signal is placed by comparator 49 on line 61 signifying that a miss has occurred for tag RAM 41.

At the same time the cache index is being used by tag RAM 41 and data RAM 43, the cache index is also used by tag RAM 42 and data RAM 44. The cache index portion of the read address is used to access from tag RAM 42 the address tag of the current data line in data RAM 44 at the location specified by the cache index. Tag RAM 42 places the address tag on lines 48. Comparator 50 compares the address tag from tag RAM 42 and the address tag of the read address. If these are equal, comparator 50 produces a valid signal on a line 62. The valid signal is forwarded to multiplexor 63, logical OR gate 60 and gate 65. However, during a cache read cycle a control signal on an input 67 of gate 65 disables gate 65, thus not allowing the valid signal on line 62 to reach a write enable input line 72 of data RAM 43.

Simultaneous to the access of an address tag from tag RAM 42, the cache index portion and the line offset portion of the read address are used to access a data word within data RAM 44. This data word is placed on a data RAM output 69. When a valid signal is placed on line 62 multiplexor 63 connects data output 69 to lines 12. The data word on lines 12 is returned to processor 1. When the address tag from tag RAM 42 and the address tag of the read address are not equal, an invalid signal is placed by comparator 50 on line 62 signifying that a miss has occurred for tag RAM 42.

When comparator 49 and comparator 50 both produce an invalid signal, there is a cache miss. Then a line of data containing the word addressed by the read address is fetched from main memory 3 and placed in either data RAM 43 or data RAM 44. The address tag for the fetched data line is simultaneously placed respectively in either tag RAM 41 or tag RAM 42.

When processor 1 desires to write data to cache 2, processor 1 places a write address of data to be written on lines 11. Processor 1 also places the data to be written onto lines 10. The cache index portion of the write address is used to access from tag RAM 41 the address tag of the current data line in data RAM 43 at the location specified by the cache index. Tag RAM 41 places the address tag on lines 47. Comparator 49 compares the address tag from tag RAM 41 and the address tag of the write address. If these are equal, comparator 49 produces a valid signal on line 61. The valid signal is forwarded to gate 64. During a cache write cycle, the control signal on input 66 of gate 64 enables gate 64, thus allowing the valid signal on line 61 to reach write enable input line 71 of data RAM 43.

Simultaneous to the access of an address tag from tag RAM 41, the cache index portion and the line offset portion of the write address are used to address a memory location in data RAM 43. Also, the data on lines 10 is applied to the data input of data RAM 43. When a valid signal is placed on line 61, the data word on line 10 is placed in data RAM 43 at the memory location specified by the cache index portion and the line offset portion of the address lines. When the address tag from tag RAM 41 and the address tag of the write address are not equal, an invalid signal is placed by comparator 49 on line 61 signifying that a miss has occurred for tag RAM 41.

At a same time the cache index is being used by tag RAM 41 and data RAM 43, the cache index is also used by tag RAM 42 and data RAM 44. The cache index portion of the write address is used to access from tag RAM 42 the address tag of the current data line in data RAM 44 at the location specified by the cache index. Tag RAM 42 places the address tag on lines 48. Comparator 50 compares the address tag from tag RAM 42 and the address tag of the write address. If these are equal, comparator 50 produces a valid signal on line 62. The valid signal is forwarded to gate 65. During a cache write cycle the control signal on input 67 of gate 65 enables gate 65, thus allowing the valid signal on line 62 to reach write enable input line 72 of data RAM 44.

Simultaneous to the access of an address tag from tag RAM 42, the cache index portion and the line offset portion of the write address are used to address a memory location in data RAM 44. Also, the data on lines 10 is applied to the data input of data RAM 44. When a valid signal is placed on line 62, the data word on line 10 is placed in data RAM 44 at the memory location specified by the cache index portion and the line offset portion of the address lines. When the address tag from tag RAM 42 and the address tag of the read address are not equal, an invalid signal is placed by comparator 50 on line 62 signifying that a miss has occurred for tag RAM 42.

When both comparator 49 and comparator 50 indicate that a miss has occurred, then a line of data containing the word addressed by the write address is fetched from main memory 3 and placed in either data RAM 43 or data RAM 44. The address tag for the fetched data line is simultaneously placed respectively in either tag RAM 41 or tag RAM 42. The new word may then be written into the appropriate data RAM.

Figure 4:
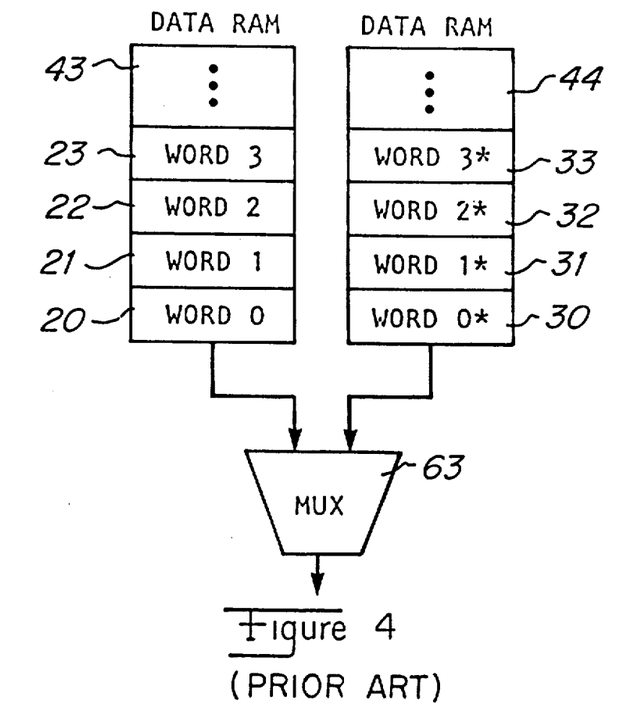
FIGS. 4 and 5 show prior art organization of memory locations within data RAMs for the multi-way set-associative cache of FIG. 2.

FIG. 4 shows a typical prior art arrangement of data in data RAM 43 and data RAM 44. A first block (or line) of data includes sixteen words of which four are shown: a word 0 in a location 20 in data RAM 43, a word 1 in a location 21 in data RAM 43, a word 2 in a location 22 in data RAM 43 and a word 3 in a location 23 in data RAM 43. A second block of data includes sixteen words of which four are shown: a word 0* in a location 30 in data RAM 44, a word 1* in a location 31 in data RAM 44, a word 2* in a location 32 in data RAM 44 and a word 3* in a location 33 in data RAM 44. If, for example, word 0 and word 1 form a double-word, word 2 and word 3 form a double-word, word 0* and word 1* form a double-word, and word 2* and word 3* form a double-word, two cache access cycles would be required to access each double-word.

Figure 5:
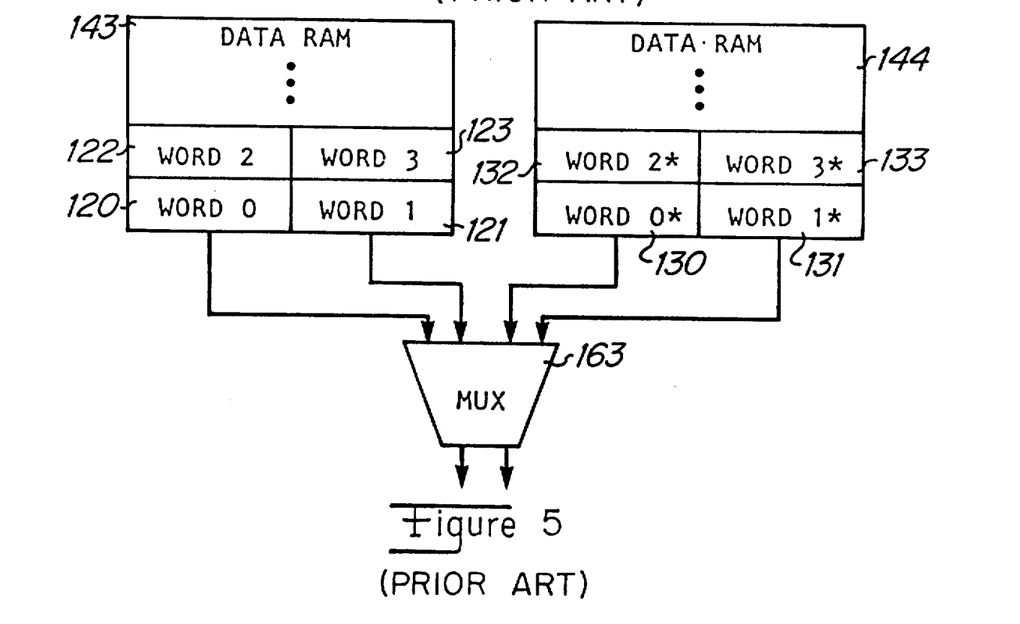

If data RAM 43, data RAM 44 and multiplexor 63 are replaced by a data RAM 143, a data RAM 144 and a multiplexor 163 respectively, as shown in FIG. 5, double-words may be accessed in a single cache access cycle. In data RAM 143, word 0 in a location 120 and word 1 in a location 121 may be forwarded to multiplexor 163 in a single cache access cycle. Similarly, word 2 in a location 122 and word 3 in a location 123 may be forwarded to multiplexor 163 in a single cache access cycle. In data RAM 144, word 0* in a location 130 and word 1* in a location 131 may be forwarded to multiplexor 163 in a single cache access cycle. Similarly, word 2* in a location 132 and word 3* in a location 133 may be forwarded to multiplexor 163 in a single cache access cycle. However, the hardware requirements for the arrangement shown in FIG. 5 may make the arrangement not cost effective.

Figure 6:
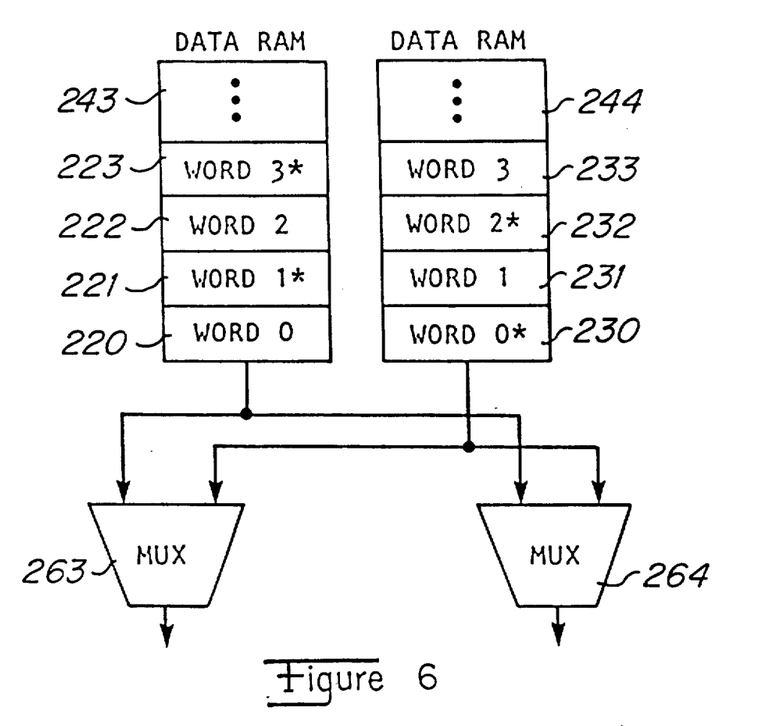
FIG. 6 shows the organization of memory locations within data RAMs for a multi-way set-associative cache in accordance with a preferred embodiment of the present invention.

In FIG. 6, an arrangement is shown which efficiently allows the access of single words or double words within a data RAM 243 and a data RAM 244. In data RAM 243, word 0 from the first block (or line) is shown stored in a location 220 and word 2 from the first block is shown stored in a location 222. Also in data RAM 243, word 1* from the second block is shown stored in a location 221 and word 3* from the second block is shown stored in a location 223. In data RAM 244, word 0* from the second block is shown stored in a location 230 and word 2* from the second block is shown stored in a location 232. Also in data RAM 244, word 1 from the first block is shown stored in a location 231 and word 3 from the first block is shown stored in a location 233.

Figure 7:
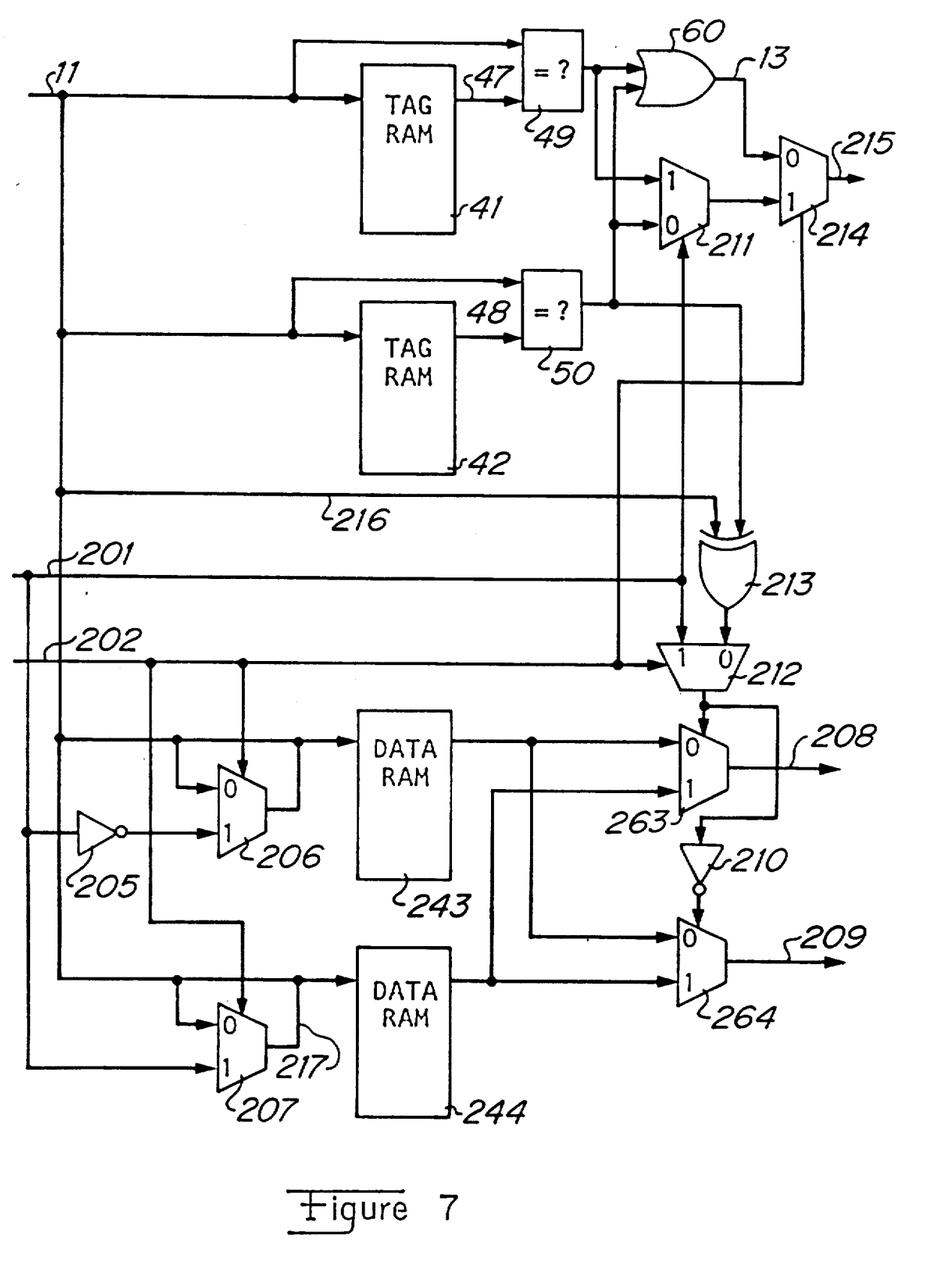
FIG. 7 shows additional hardware logic added to the multi-way set-associative cache memory shown in FIG. 2 in order allow for the organization of memory locations within the data RAMs shown in FIG. 6.

In FIG. 7, additional logic is shown added to multi-way set-associative cache 2 in order to allow access of data in data RAM 243 and data RAM 244 organized as shown in FIG. 6. When tag RAM 42 contains the tag address of a line containing a double word, the most significant word of the double word resides in data RAM 244 and the least significant word of the double word resides in data RAM 243. Conversely, when tag RAM 41 contains the tag address of a double word, the most significant word of the double word entry resides in data RAM 243 and the least significant word of the double word entry resides in data RAM 244.

A line 202 is used to control multiplexor 206, multiplexor 207, a multiplexor 214 and a multiplexor 212. When accessing single words, line 202 is held to logic 0. When accessing double words, line 202 is held to logic 1.

The least significant bit of line offset 153 on lines 11 is passed through a multiplexor 206 before being forwarded to data RAM 243. Also providing an input to multiplexor 206 is an inverter gate 205. Similarly, the least significant bit of line offset 153 on lines 11 is passed through a multiplexor 207 before being forwarded to data RAM 244. Also providing an input to multiplexor 207 is a line 201.

Line 201 provides input to multiplexor 207, to multiplexor 206 through inverter 205, and to multiplexor 212. Line 201 is also used to control multiplexor 211. For double-word accesses, line 201 is used to predict which of tag RAM 41 and tag RAM 42 contain the address of the double word to be accessed and thus where the least significant word and the most significant word of the double word reside. If line 201 is set to logic 1, it is predicted that tag RAM 41 contains the address of the double word and that the most significant word resides in data RAM 243 and the least significant word resides in data RAM 244. If line 201 is set to logic 0, it is predicted that tag RAM 42 contains the address of the double word and that the most significant word resides in data RAM 244 and the least significant word resides in data RAM 243.

A multiplexor 263 and a multiplexor 264 each receive output from data RAM 243 and data RAM 244. An inverter 210 assures that data multiplexor 263 does not place on an output 208 data from the same data RAM as the data RAM which provides data which multiplexor 264 places on an output 209. For double word accesses, the least significant word is placed on line 208 and the most significant word is placed on line 209. For single word accesses, the word sought, if it resides in data RAM 243 or data RAM 244, is placed upon line 208.

A line 215 from multiplexor 214 is used to determine whether a hit has been made. For double word accesses multiplexor 214 selects the output of multiplexor 211. For single word accesses multiplexor 214 selects an output 13 of logical OR gate 60.

For single word accesses multiplexor 212 selects as input the output of a logical "EXCLUSIVE OR" gate 213. XOR gate 213 receives as input the output of comparator 50 and, on a line 216, the least significant bit of line offset of the address on lines 11. This assures that for single word accesses the correct output is placed on lines 208.

Figure 8:
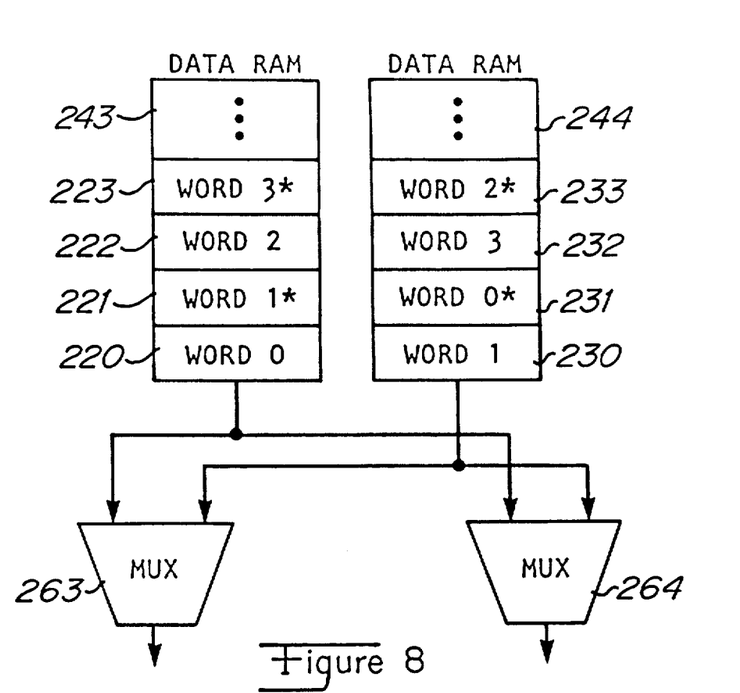
FIGS. 8, 9 and 10 show alternate embodiments of the organization of memory locations within data RAMs in accordance with preferred embodiments of the present invention.

With minimal variations in logic, data may be stored within data RAM 243 and data RAM 244 in alternate configurations. One alternate embodiment is shown in FIG. 8. In data RAM 243 word 0 from the first block is shown stored in a location 220 and word 2 from the first block is shown stored in a location 222. Also in data RAM 243 word 1* from the second block is shown stored in a location 221 and word 3* from the second block is shown stored in a location 223. In data RAM 244 word 0* from the second block is shown stored in a location 231 and word 2* from the second block is shown stored in a location 233. Also in data RAM 244 word 1 from the first block is shown stored in a location 230 and word 3 from the first block is shown stored in a location 232. In order to support this variation of the configuration of data RAM 243 and data RAM 244, a logical inverter can be placed in the signal path between multiplexor 207 and data RAM 244 at a location 217.

Figure 9:
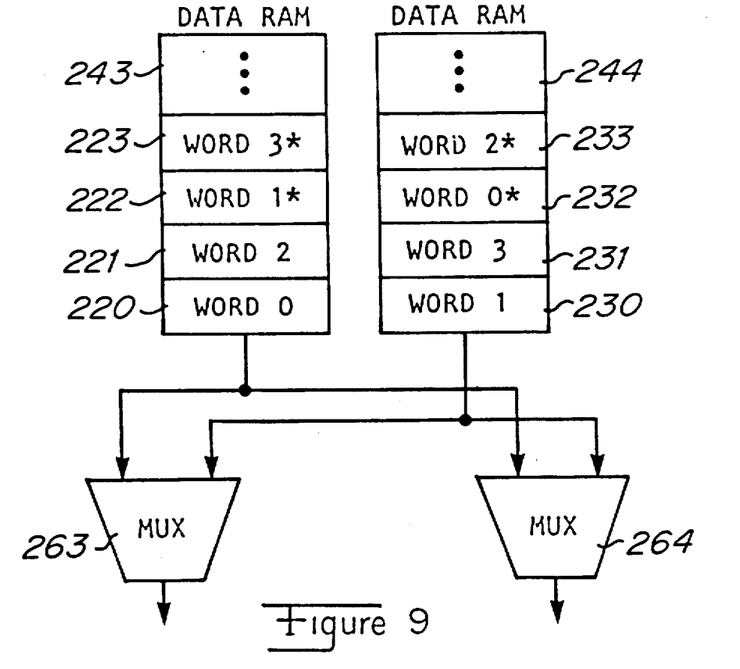

FIG. 9 shows another alternate way to configure data in data RAM 243 and data RAM 244. In data RAM 243, word 0 from the first block is shown stored in a location 220 and word 2 from the first block is shown stored in a location 221. Also in data RAM 243, word 1* from the second block is shown stored in a location 222 and word 3* from the second block is shown stored in a location 223. In data RAM 244, word 0* from the second block is shown stored in a location 232 and word 2* from the second block is shown stored in a location 233. Also in data RAM 244, word 1 from the first block is shown stored in a location 230 and word 3 from the first block is shown stored in a location 231.

In order to support this variation of the configuration of data RAM 243 and data RAM 244, a logical inverter can be placed in the signal path between multiplexor 207 and data RAM 244 at a location 217. Also, at the input of data RAM 243, the least significant bit of the line offset 153 is swapped with the second to the least significant bit of line offset 153. Similarly, at the input of data RAM 244, the least significant bit of the line offset 153 is swapped with the second to the least significant bit of line offset 153.

There are other acceptable configurations of data within data RAM 243 and data RAM 244. For optimal performance, that is to obtain the performance and implementation advantages of the present invention, the corresponding words of two lines in a set should be in different data RAMs. Further, within the same line even and odd words should be in different data RAMs.

Figure 10:
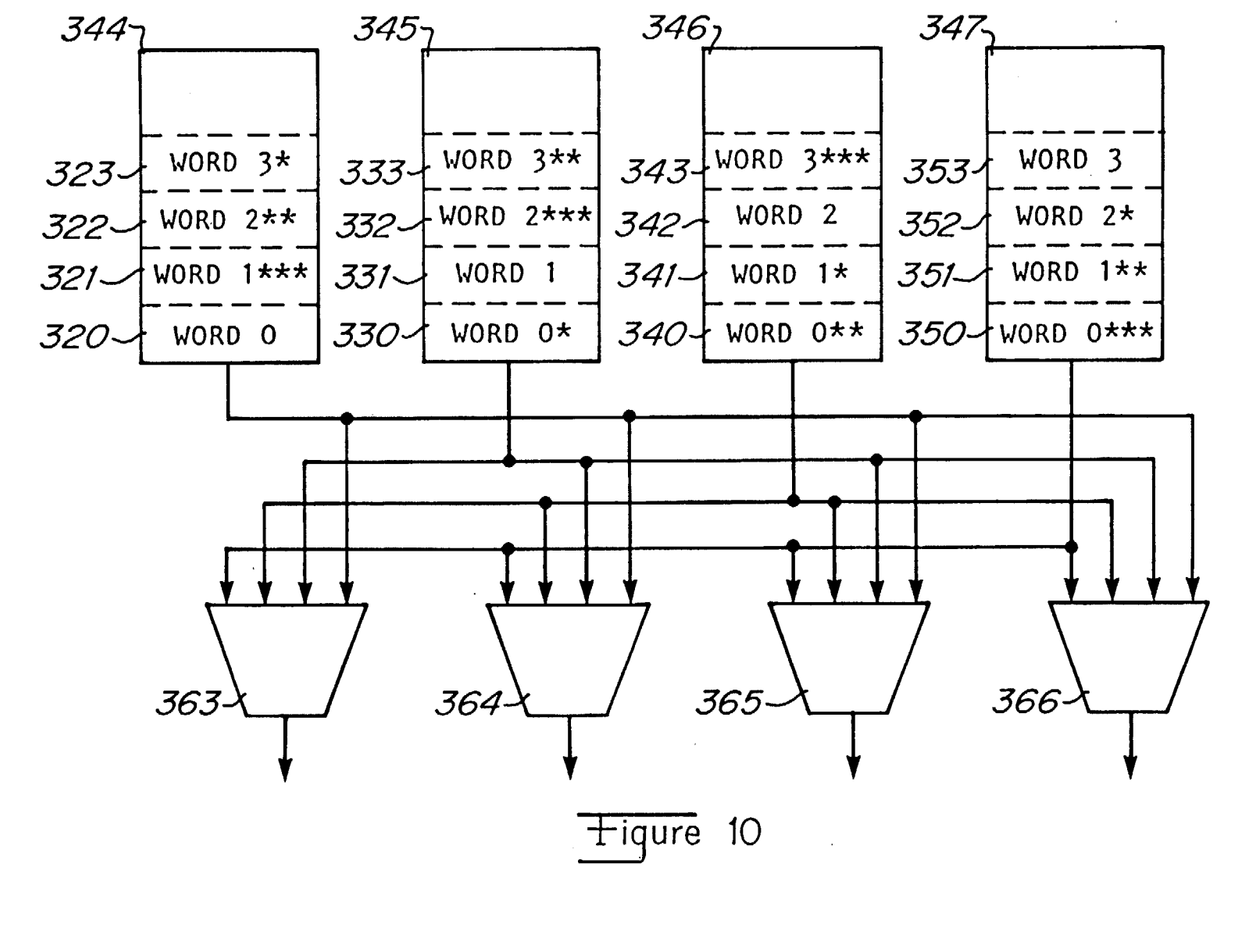

The concepts herein can be utilized to allow efficient access to multiple words of any length. For example, in FIG. 10 is shown a data RAM configuration that allows single word access or quadruple word access. In a data RAM 344, a word 0 from a first block is shown stored in a location 320, a word 3* from a second block is shown stored in a location 323, a word 2 from a third block is shown stored in a location 322 and a word 1* from a fourth block is shown stored in a location 321. In a data RAM 345, a word 1 from the first block is shown stored in a location 331, a word 0* from the second block is shown stored in a location 330, a word 3 from the third block is shown stored in a location 333 and a word 2* from the fourth block is shown stored in a location 332. In a data RAM 346, a word 2 from the first block is shown stored in a location 342, a word 1* from the second block is shown stored in a location 341, a word 0 from the third block is shown stored in a location 340 and a word 3* from the fourth block is shown stored in a location 343. In a data RAM 347, a word 3 from the first block is shown stored in a location 353, a word 2* from the second block is shown stored in a location 352, a word 1 from the third block is shown stored in a location 351 and a word 0* from the fourth block is shown stored in a location 350. A multiplexor 363, a multiplexor 364, a multiplexor 365 and a multiplexor 366 are used to select output from data RAM 344, data RAM 345, data RAM 346 and data RAM 347.

Data within data RAMS 344, 345, 346 and 347 may be configured differently. Generally, for access of multiple-words from multi-way set-associative cache memories configured according to the preferred embodiment of the present invention, corresponding words of each line of data are placed into different data RAMs. Also, each word from each multiple-word is placed in different data RAMs.

For the circuit in FIG. 7, a simple prediction access algorithm may be used to select the value on line 201 and thus the tag RAM in which a double word resides. The replacement algorithm to the cache may be selected or altered in order to increase the hit rate of the simple prediction access algorithm.

For example, the implementation shown in FIG. 7 allows for two different methods of access. Two words from any one line can be accessed, or one word from each of two lines can be accessed. If two words from one line are accessed, the line desired must be known, or at least predicted, before the access can begin. For the case of cache move-ins, the replacement algorithm determines which line is to be filled well before the move-in data arrives from main memory 3. For instruction prefetch, once it is known which line a given instruction is fetched from, subsequent instructions will come from the same line until a branch instruction, or the end of the line is encountered.

For double-word accesses, it is predicted which line of the set the data will be in, and two words are read from that one line. The prediction itself can be very simple, as long as it will always yield the same result for the same address. For example, the prediction may be based on two address bits EXCLUSIVELY OR'ed together.

If a double word of data is not present in the cache (i.e. not in data RAM 243 and data RAM 244), which will be the case the first time a particular double word is accessed, the double word must be brought into the cache. When this happens, the normal cache replacement algorithm is not used. Instead, the address is placed into the tag RAM of tag RAM 41 or tag RAM 42 where the address was predicted to be. The data is placed in data RAM 243 and data RAM 244 accordingly. The next time the double word is accessed, it will be exactly where it is predicted to be.

To the extent that double words are only accessed using double word load and store instructions, the cache will act exactly like a direct mapped cache, with twice as many sets as it actually has. Double words will be accessed in a single cycle. Cache performance for the cache shown in FIG. 6 will be slightly degraded from the cache shown in FIG. 5, as the cache of FIG. 6 acts as if it were directly mapped, instead of two-way set-associative for double word accesses as in the cache shown in FIG. 5.

During single word accesses, addresses for data moved-in to the cache shown in FIG. 6 and FIG. 7 are placed in tag RAM 41 and tag RAM 42 using the standard least-recently-used (LRU) algorithm and not the above-described double word prediction algorithm. The data is placed in data RAM 243 and 244 accordingly. Thus, if a double word is first brought into the cache using single word accesses, as might be the case if a block of data is being moved from one memory location to another, then there will be a fifty percent chance that a subsequent double word access will result in the double word prediction algorithm picking the wrong tag RAM as having the address of the double word.

In that case, the first attempt to access the desired double word will fail and a penalty will be incurred. One of several methods of proceeding may be chosen. First, the cache can be re-accessed to read the correct tag RAM. This will probably provide the lowest penalty, but will result in incurring the penalty every time the double word is accessed in the future, until the double word is moved-out of the cache and brought back in by a double word access.

Second, addresses for data in the entire line in which the double word resides can be moved to the other tag RAM and data in the data RAM swapped accordingly. If the data being replaced is dirty, then the victim data, that is data which is overwritten or copied out of cache memory when new data is placed in the cache memory, can also be moved within the tag RAMs and data RAMs or the victim data may be moved out to memory 3. This is more complicated than the first option, but the penalty is only incurred once.

Third, a cache miss may be forced. This is a less complicated approach to achieving the second option, but results in the greatest penalty the three options. This is because if the line containing the double word is dirty, the line must first be moved out to main memory 3 and then moved back into the cache at the location predicted by the double word prediction algorithm.

The performance of double word data accesses in the cache shown in FIG. 6 will be downgraded as compared to the cache shown in FIG. 5 if many double words are first brought into the cache using single word accesses. The amount of degradation depends on how often this happens, which of the three above options are chosen to handle the case and how often the double word is subsequently accessed.

The cache shown in FIG. 6 is more cost effective than the prior art designs shown in FIG. 4 and FIG. 5. The cache shown in FIG. 6 allows data to be moved in at double the bandwidth that data may be moved into the cache shown in FIG. 4. This decreases the cache miss penalty and increases performance. Also, using the cache shown in FIG. 6 it is possible to achieve the same cache fill bandwidth as would be available in the cache in FIG. 5, however, only half the number of RAM integrated circuits and RAM data path signal connections are necessary. Choosing which of the tag RAMs to write the address of data and thereby how to place data in the data RAMs can be determined by a replacement algorithm well before data becomes available to write into the cache.

The cache in FIG. 6 also has an increased instruction fetch bandwidth compared to the cache shown in FIG. 4. By fetching instructions at a rate that is greater than that used to keep a pipeline filled, instructions may be accumulated in register buffers. This frees an instruction cache to fetch the targets of branches before the branches are known to be taken. The ability to do this reduces the number of wasted CPU cycles associated with taken branches.

In addition, the cache shown in FIG. 6 can be used to speed up double word accesses in systems where words would normally have to be accessed using two consecutive accesses. With the placement and line-prediction algorithms presented herein, the average cycles per double word load should average between 1.2–1.5 cycles per access.

We claim:

1. In a multi-way set-associative cache memory which stores a plurality of lines of data, each line of data containing a plurality of words of data, a method for storing and accessing data in a plurality of random access memories, the method providing for simultaneous access of words grouped as a multiple-word, the method comprising the steps of:

(a) placing corresponding words of each line of data in the plurality of lines of data into a different random access memory from the plurality of random access memories so that no two words from any multiple-word are placed into a single random access memory from the plurality of random access memories; and, (b) when accessing an addressed multiple-word from the multi-way set-associative cache memory, simultaneously accessing from each random access memory a different word of the addressed multiple-word.

2. A method as in claim 1 wherein step (b) includes selecting from which random access memory a high order word of the multiple-word is accessed and from which random access memory a low order word is accessed.

3. A method as in claim 1 wherein the method additionally provides for access of individual words and additionally comprises the step of:

(c) when accessing data from the multi-way set-associative cache memory indicating whether a single word or a multiple-word is to be accessed.

4. A multi-way set-associative cache for storing a plurality of lines of data, each line of data containing a plurality of words of data, and for providing for simultaneous access of words grouped as a multiple-word, the multi-way set-associative cache comprising:

a plurality of data storage means for storing data, data being placed within the plurality of data storage means so that corresponding words of each line of data in the plurality of lines of data are placed into a different data storage means from the plurality of data storage means and so that no two words from any multiple-word are placed into a single data storage means from the plurality of data storage means; and, selection means, coupled to each of the plurality of data storage means, for allowing simultaneous selection of a word of data from each data storage means from the plurality of data storage means so that upon a cache hit for an addressed multiple-word, each data storage means outputs a different word of the addressed multiple-word.

5. A multi-way set-associative cache as in claim 4 wherein the selection means includes:

for each data storage means of the plurality of data storage means, a tag checking means for checking whether a first word from an addressed multiple-word resides in the data storage means; and, tag selection means for selecting an output from a first tag checking means, the first tag checking means being for a first data storage means in which it is predicted a first word from the addressed multiple-word resides;

wherein the first selection means outputs a signal indicating whether there is a cache hit for an access of the addressed multiple-word.

6. A multi-way set-associative cache as in claim 5 wherein the selection means additionally includes:

data selection means for selecting output from the first data storage means in which it is predicted the first word from the addressed multiple-word resides to be a first data output word.

7. A multi-way set-associative cache as in claim 4 wherein the multi-way set-associative cache also provides for access of an addressed individual word and wherein the selection means additionally comprises:

word detection means for, in response to a selection of an access of an addressed individual word, detecting whether the individual word resides in any of the plurality of data storage means; and, word output means for, in response to detection by the word detecting means, placing the addressed individual word on an output of the multi-way set-associative cache.

8. In a two-way set-associative cache memory, a method for storing and retrieving data in a first random access memory and a second random access memory, the method providing for simultaneous access of words grouped as a double-word, the method comprising the steps of:

(a) placing lines of data in the first random access memory and the second access memory so that the following conditions are met:

(a1) for each set of data, corresponding words of each line of data in the set are placed so that a first of the corresponding words is in the first random access memory and a second of the corresponding words is in the second random access memory;

(a2) for each double-word of data a first word of the double-word is placed in the first random access memory and a second word of the double-word is placed in the second random access memory; and, (b) for each double-word that is accessed, simultaneously accessing a first word of the double-word from the first random access memory and a second word of the double-word from the second random access memory.

9. A method as in claim 8 wherein step (b) includes the substeps of:

(b.1) indicating in which of the first random access memory and the second random access memory the first word of the double-word is predicted to be stored; and, (b.2) if the first word of the double-word is not stored in the random access memory indicated in step (b.1), attempting to access the first word of the double-word from whichever of the first random access memory and the second random access memory is not indicated in step (b.1).

10. A method as in claim 8 wherein step (b) includes the substeps of:

(b.1) indicating in which of the first random access memory and the second random access memory the first word of the double-word is predicted to be stored; and, (b.2) if the first word of the double-word is in a random access memory not indicated in step (b.1), exchanging words in the first random access memory and the second random access memory so that the first word of the double-word is in the random access memory indicated in step (b.1).

11. A method as in claim 8 wherein step (b) includes the substeps of:

(b.1) indicating in which of the first random access memory and the second random access memory the first word of the double-word is predicted to be stored; and, (b.2) if the first word of the double-word is not in a random access memory indicated in step (b.1) transferring the first word of the double-word from a main memory to the random access memory indicated in step (b.1).

12. A method as in claim 8 wherein step (b) includes selecting one of the first word and the second word as a high order word of a double-word being accessed.

13. A method as in claim 8 wherein the method also provides for access of individual words and additionally comprises the step of:

(c) when accessing data from the two-way set-associative cache memory, indicating whether a single word or a double-word is to be accessed.

14. A two-way set-associative cache for storing lines of data in sets, each set of data including two lines of data and for providing for simultaneous access of words grouped as a double-word, the two-way set-associative cache comprising:

a first data storage means for storing data;

a second data storage means for storing data; and, selection means, coupled to the first data storage means and to the second data storage means, for allowing simultaneous selection of a word of data from the first data storage means and the second data storage means so that upon a cache hit for an addressed double-word, the first data storage means and the second data storage means each output a different word of the addressed double-word;

wherein data is placed within the first data storage means and the second data storage means so that for each set of data, corresponding words of each line of data in the set are placed so that a first of the corresponding words is in the first random access memory and a second of the corresponding words is in the second random access memory and for each double-word of data a first word of the double-word is placed in the first random access memory and a second word of the double-word is placed in the second random access memory.

15. A two-way set-associative cache as in claim 14 wherein the selection means includes:

a first tag checking means for checking whether a first word from an addressed double-word resides in the first data storage means;

a second tag checking means for checking whether the first word from the addressed double-word resides in the second data storage means; and, tag selection means for selecting which of the first tag checking means and the second tag checking means will provide a signal indicating whether there is a cache hit for an access of the addressed double-word;

wherein the tag selection means selects an output from the first tag checking means when a prediction signal indicates it is predicted the first word from the addressed double-word resides in the first data storage means, and the tag selection means selects an output from the second tag checking means when the prediction signal indicates it is predicted the first word from the addressed double-word resides in the second data storage means.

16. A two-way set-associative cache as in claim 15 wherein the selection means additionally includes:

data selection means for, based on the prediction signal, selecting output from a first of the first data storage means and the second data storage means to be a high order word of the addressed double-word, and selecting output from a second of the first data storage means and the second data storage means to be a low order word of the addressed double-word.

17. A two-way set-associative cache as in claim 14 wherein the two-way set-associative cache also provides for access of individual words and wherein the selection means additionally comprises:

word detection means for, in response to a selection of an access of an addressed individual word, detecting whether the individual word resides in one of the first data storage means and the second data storage means; and, word output means for, in response to detection by the word detecting means, placing the the addressed individual word on an output of the two-way set-associative cache.

* * * * *